United States Patent [19]

Langer et al.

[11] Patent Number: 4,671,585
[45] Date of Patent: Jun. 9, 1987

[54] LUMINAIRE ADAPTOR ASSEMBLY

[75] Inventors: Joseph Langer; Raymond A. Brown; Jon D. Hinnefeld, all of Vermilion, Ohio

[73] Assignee: National Service Industries, Atlanta, Ga.

[21] Appl. No.: 874,496

[22] Filed: Jun. 16, 1986

[51] Int. Cl.[4] ............................................ H01R 13/60
[52] U.S. Cl. ................................... 439/117; 439/119; 439/207
[58] Field of Search ............... 339/20, 21 R, 21 S, 339/22 R, 22 B, 22 T, 23, 24

[56] References Cited

U.S. PATENT DOCUMENTS

| | | | |
|---|---|---|---|
| 2,720,632 | 10/1955 | Stieglitz | 339/22 B |
| 2,992,401 | 7/1961 | Lewis | 339/22 B |
| 3,015,082 | 12/1961 | Meacham | 339/22 B |
| 3,015,795 | 1/1962 | Meacham | 339/22 B |
| 3,150,908 | 9/1964 | Verrone | 339/91 R |
| 3,239,795 | 3/1966 | Verrone | 339/91 |
| 3,273,103 | 9/1966 | Ericson | 339/22 B |
| 3,391,377 | 7/1968 | Corl et al. | 339/21 R |
| 3,395,378 | 7/1968 | Ericson | 339/34 |
| 3,422,387 | 1/1969 | Sprigings et al. | 339/14 R |
| 3,489,981 | 1/1970 | Corl et al. | 339/21 R |
| 3,503,032 | 3/1970 | Routh et al. | 339/14 R |
| 3,529,275 | 9/1970 | Routh | 339/22 R |
| 3,589,660 | 6/1971 | Dunckel | 248/343 |
| 3,596,226 | 7/1971 | Meltzer | 339/21 R |
| 3,601,748 | 8/1971 | Hart | 339/22 B |
| 3,605,064 | 9/1971 | Routh | 339/21 R |
| 3,611,252 | 10/1971 | Fremont | 339/21 R |
| 3,649,951 | 3/1972 | Routh et al. | 339/21 R |
| 3,688,240 | 8/1972 | Routh et al. | 339/21 R |
| 3,731,255 | 5/1973 | Contratto | 339/21 R |
| 3,737,834 | 6/1973 | Contratto | 339/21 R |
| 3,748,629 | 7/1973 | Price | 339/21 R |
| 3,771,103 | 11/1973 | Attema | 339/21 R |
| 3,794,955 | 2/1974 | Bertrams | 339/21 R |
| 3,795,886 | 3/1974 | Hart | 339/21 R |
| 3,813,633 | 5/1974 | Clement | 339/21 R |
| 3,832,503 | 8/1974 | Crane | 339/21 R |
| 3,848,715 | 11/1974 | Hesse | 339/21 R |
| 3,871,729 | 3/1975 | Attema | 339/21 R |
| 3,871,730 | 3/1975 | Hesse | 339/21 R |
| 3,894,781 | 7/1975 | Donato | 339/22 B |
| 4,010,997 | 3/1977 | Bulanchuk | 339/22 B |
| 4,029,378 | 6/1977 | Bolis | 339/22 B |
| 4,032,208 | 6/1977 | Berkenhoff | 339/21 R |
| 4,050,555 | 9/1977 | Ross, Jr. | 339/22 T |
| 4,053,194 | 10/1977 | Gilman | 339/21 R |
| 4,087,147 | 5/1978 | Silvestris et al. | 339/21 R |
| 4,089,578 | 5/1978 | Valtonen | 339/21 R |
| 4,090,594 | 5/1978 | Ross, Jr. | 339/22 T |
| 4,096,349 | 6/1978 | Donato | 339/4 |
| 4,105,099 | 8/1978 | Bertrams et al. | 339/22 T |
| 4,108,523 | 8/1978 | Bolis | 339/22 B |
| 4,176,896 | 12/1979 | Wehling | 339/22 R |
| 4,245,874 | 1/1981 | Bishop | 339/22 B |
| 4,256,357 | 3/1981 | Vasseur et al. | 339/21 R |
| 4,289,365 | 9/1981 | Rutgers | 339/21 R |

Primary Examiner—Eugene F. Desmond
Assistant Examiner—Gary F. Paumen
Attorney, Agent, or Firm—Emch, Schaffer, Schaub & Porcello Co.

[57] ABSTRACT

An adaptor for connecting a luminaire to a track receptacle is disclosed. The track receptacle has retaining flanges along its bottom edges and an insulator assembly adjacent the top. The insulator assembly mounts parallel electrical conductors in the top of the track receptacle and also defines parallel guide channels. The adaptor includes a body having a lid. The lid includes retainers for mating with the retaining flanges. A pair of spring biased electrical contacts extend upwardly from a contact housing mounted in the body and extending through the lid. The housing includes a pair of guide members which are rotationally biased to an aligned position for insertion into the track receptacle.

9 Claims, 9 Drawing Figures

LUMINAIRE ADAPTOR ASSEMBLY

BACKGROUND OF THE INVENTION

The present invention relates to a luminaire adaptor assembly which is used in connection with a track lighting system. Track lighting systems are known in the art and generally include a longitudinally extending track receptacle which have at least two insulated current conductors. Often, these current conductors are placed on the side of the track receptacle.

A plug or an adaptor is provided with at least two electrical contact pins for contacting the conductors in the receptacle.

Various types of electrical components are attached to the other end of the adaptor. While the present adaptor may be used with other components, it is preferably used with luminaires such as pivotally mounted lights having lamp housings of various shapes including spheres and cylinders.

Adaptor assemblies, according to the present invention, are used in various locations sometimes by workers who have limited electrical training. An example of the use of an adaptor assembly, according to the present invention, would be in an art gallery. Art objects are placed along walls and on the floor of the gallery. When a current exhibition is dismantled and a new art exhibition placed in the gallery, it is necessary to change the lighting to highlight the locations, sizes and media of the new exhibition. This often entails moving the adaptor assemblies in the track receptacle from the old locations to new locations.

The primary advantage of the track lighting luminaire adaptor assembly, according to the present invention, is its flexibility and ease of operation, which is achieved because the track receptacle is symmetrical and therefore the adaptor may be installed in either of two directions, each being 180° apart without manually adjusting the contacts to engage separate circuits as is the case on some non-symmetrical designs.

SUMMARY OF THE INVENTION

The assembly of the present invention includes a longitudinally and normally horizontally mounted track receptacle. The track receptacle includes retaining flanges along its bottom side edges and an insulator assembly adjacent its top.

The insulation assembly mounts a plurality of electrical conductors, preferably three electrical conductors, in the top of the track receptacle as opposed to the side edges as often found in prior art receptacles. The insulator assembly defines parallel guide channels between the electrical conductors.

The adaptor includes a hollow body having a lid. The lid includes retainers for mating with the track receptacle retaining flanges to secure the adaptor in the receptacle and to make electrical ground with receptacle. A pair of spring-biased electrical contacts extend upwardly from a contact housing mounted in the body. The contact housing also includes a pair of parallel guide members which are rotationally biased and received by the guide channels in the track receptacle to position the adaptor and its electrical contacts at a correct aligned position.

After insertion into the track receptacle, the adaptor body is rotated in the direction of arrows provided on one side of the body and a spring-bias latch on the body locks the body to the receptacle.

The arrow indicators on the body also indicate to the installer which electrical circuit is being used. The adaptor assembly, according to the present invention, allows the operator to balance the lighting load between, for example, two 20 amp circuits and also allows the installer, if desired, to provide two level switching.

DESCRIPTION OF THE PREFERRED EMBODIMENTS

Figure 1:
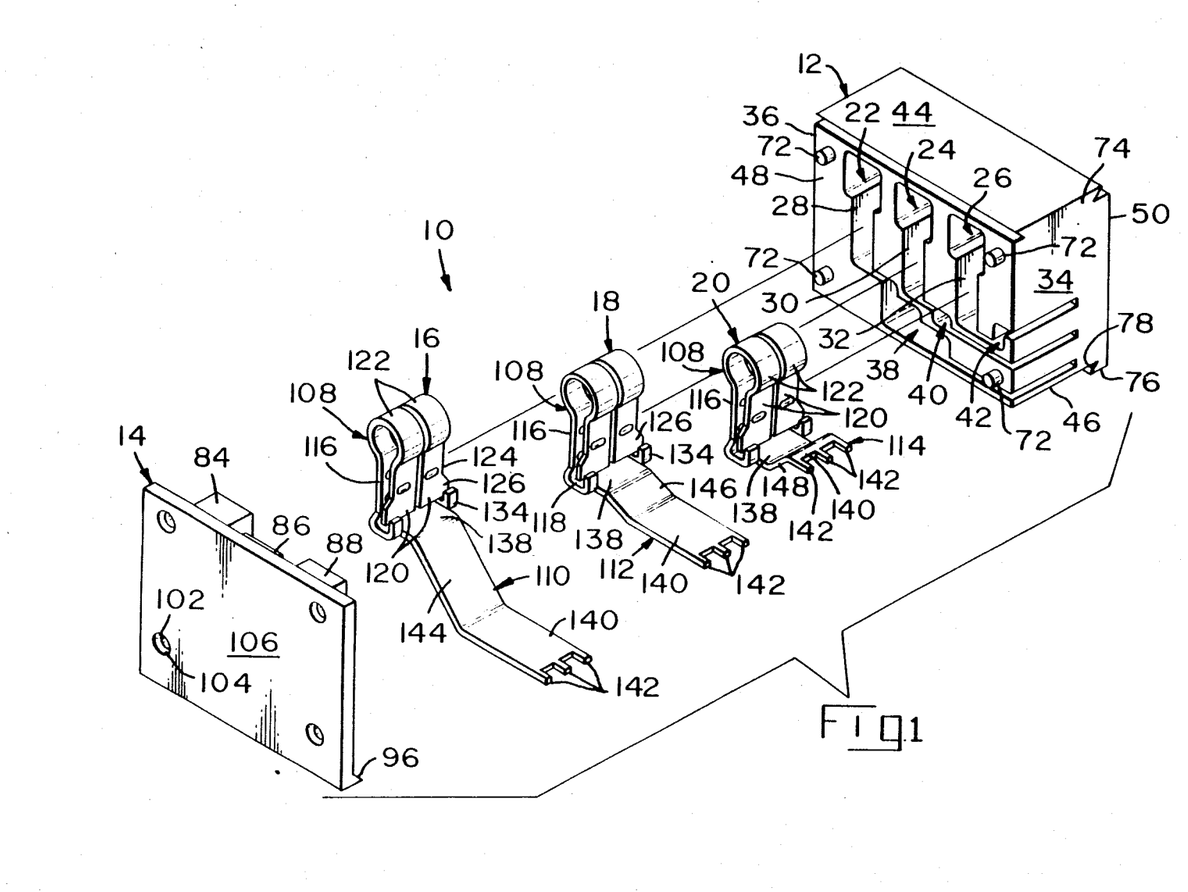
FIG. 1 is a perspective view of a track receptacle and luminaire adaptor assembly, according to the present invention.
Figures 2, 5, 6:
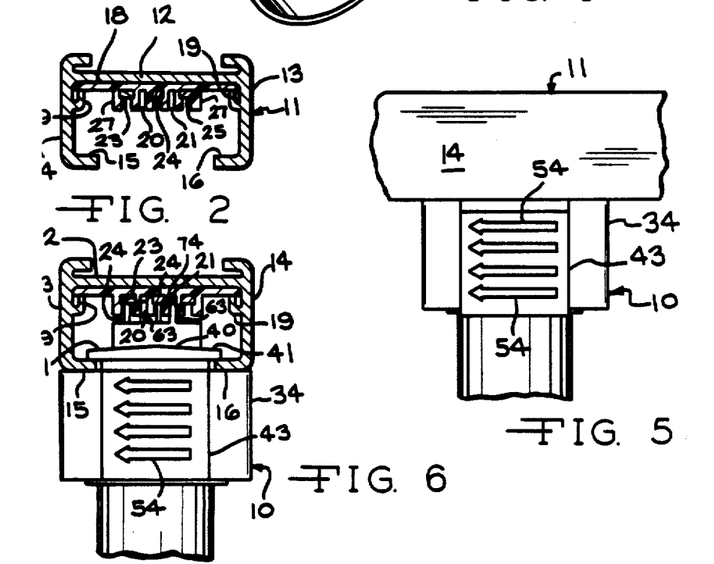
FIG. 2 is a cross-sectional view of the track receptacle taken along the line 2—2 of FIG. 1.
FIG. 5 is a fragmentary side elevational view of the adaptor assembly and track receptacle showing the latching mechanism in the unlatched position.
FIG. 6 is a view similar to FIG. 5, showing the adaptor rotated 90° and showing the latch in the latched position.
Figures 2A, 2B:
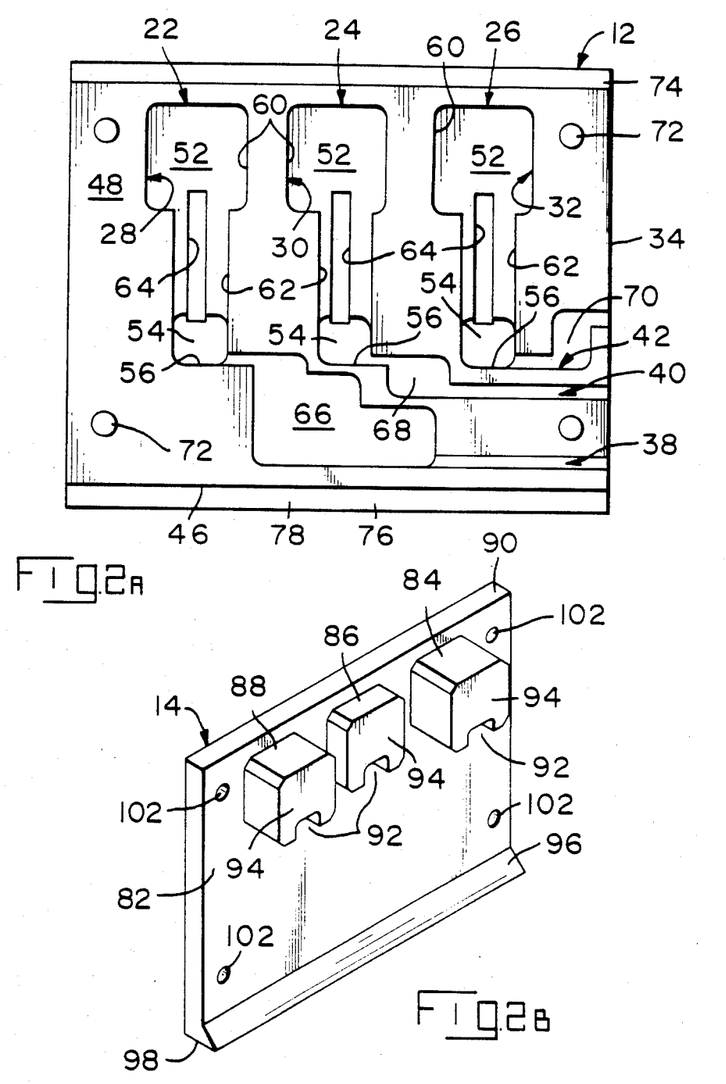

Referring to FIG. 1, a luminaire adaptor assembly, according to the present invention is generally indicated by the reference number 10. The adaptor 10 is attached to a longitudinally extending track receptacle 11. Referring to FIG. 2, the track receptacle 11 includes a horizontal upper wall 12 and two downwardly depending sidewalls 13 and 14. Retaining flanges 15 and 16 extend inwardly from the respective sidewalls 13, 14. The track receptacle 11 may be constructed of various materials, including extruded aluminum and various plastics.

The track receptacle 11 has an insulator assembly 18 mounted beneath the upper wall 12. Side ribs 19 extend inwardly from the sidewalls 13 and 14 and support the insulator assembly 18.

The insulator assembly 18 defines a pair of parallel guide channels 20 and 21 which extend horizontally beneath the upper wall 12 of the track receptacle 11.

A plurality of electrical conductors 23, 24 and 25, for example copper conductors, are mounted by the insulator assembly 18 adjacent the upper wall 12 of the track receptacle 11. In this embodiment, the electrical conductors 23 and 25 are hot circuits while the center conductor 24 is a neutral or ground conductor. The bottom surfaces of the conductors 23-25 are exposed, however projections 27 defined by the insulator assembly 18 retard manual contact with the conductors 23-25.

Figure 7:
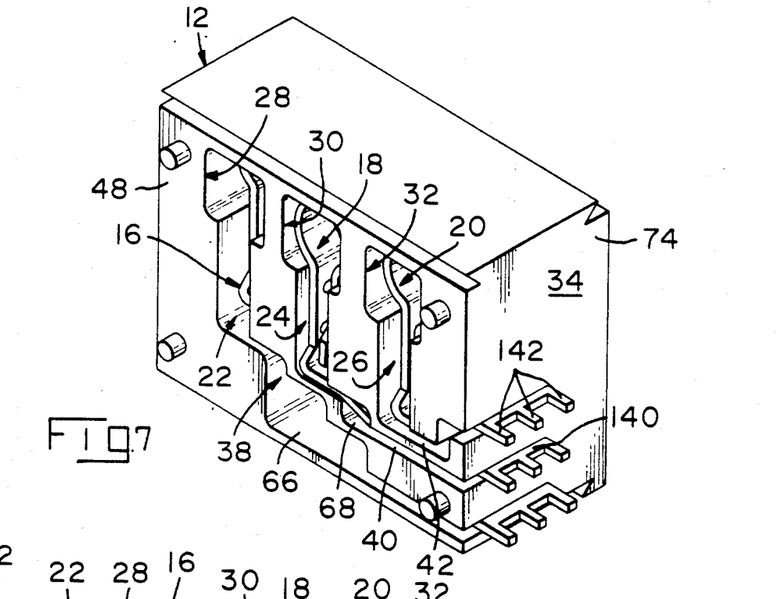
FIG. 7 is a partially sectional view taken along the line 7—7 of FIG. 3 and showing the bottom of the body of the adaptor.
Figures 7, 8, 9:
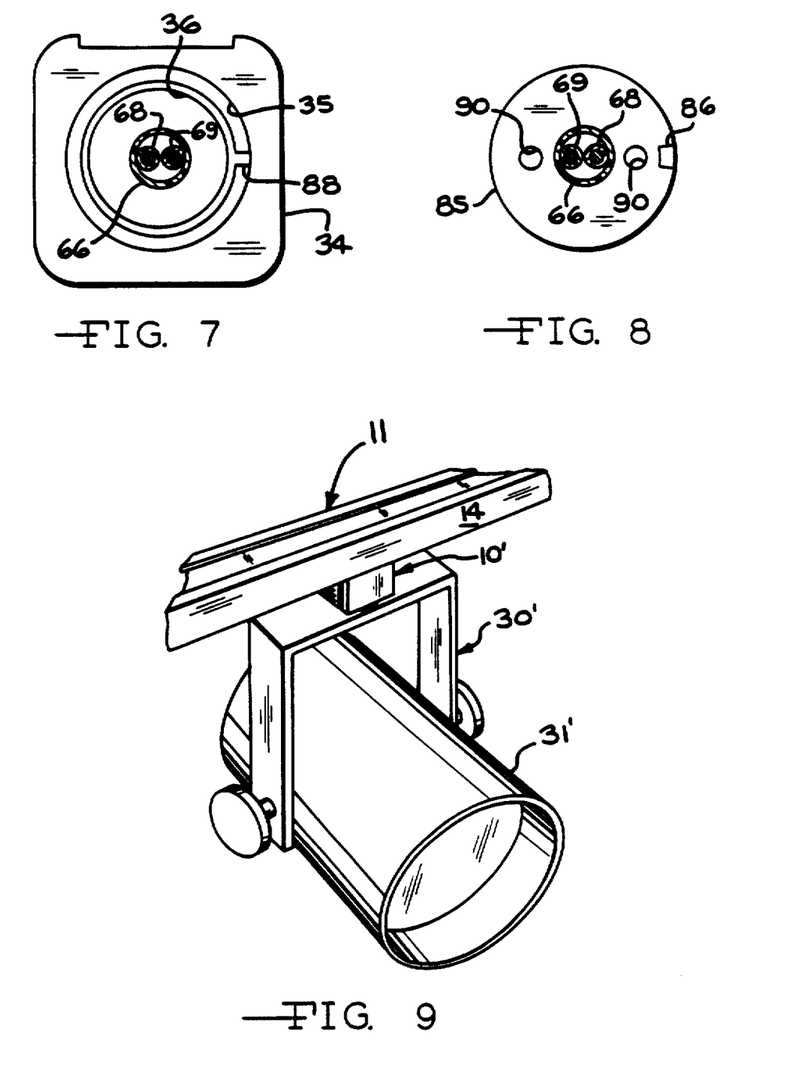
FIG. 8 is a partially sectional view taken along the line 8—8 of FIG. 3 and showing the disc which is positioned against the bottom of the body.
FIG. 9 is a perspective view similar to FIG. 1 showing a lamp housing pivotally mounted on a yoke attached to the adaptor assembly, according to the present invention.
Figure 8:
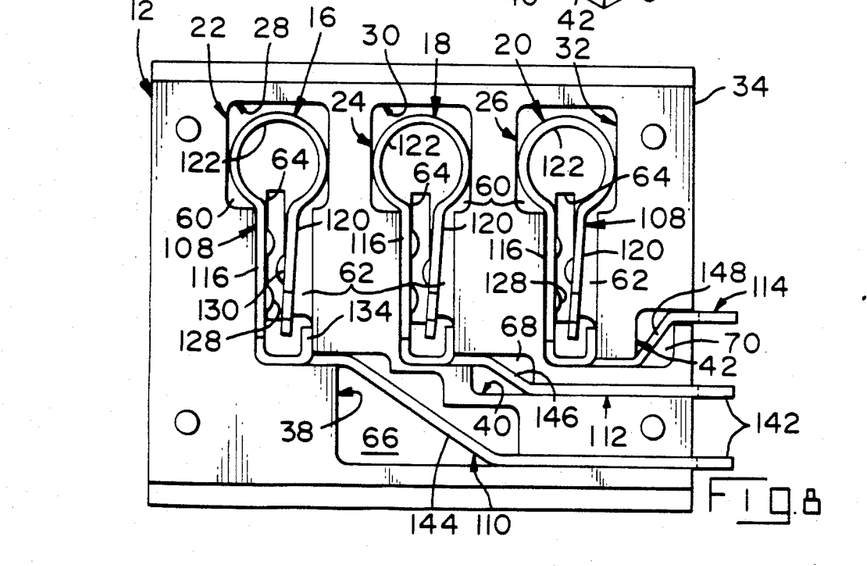
Figure 9:
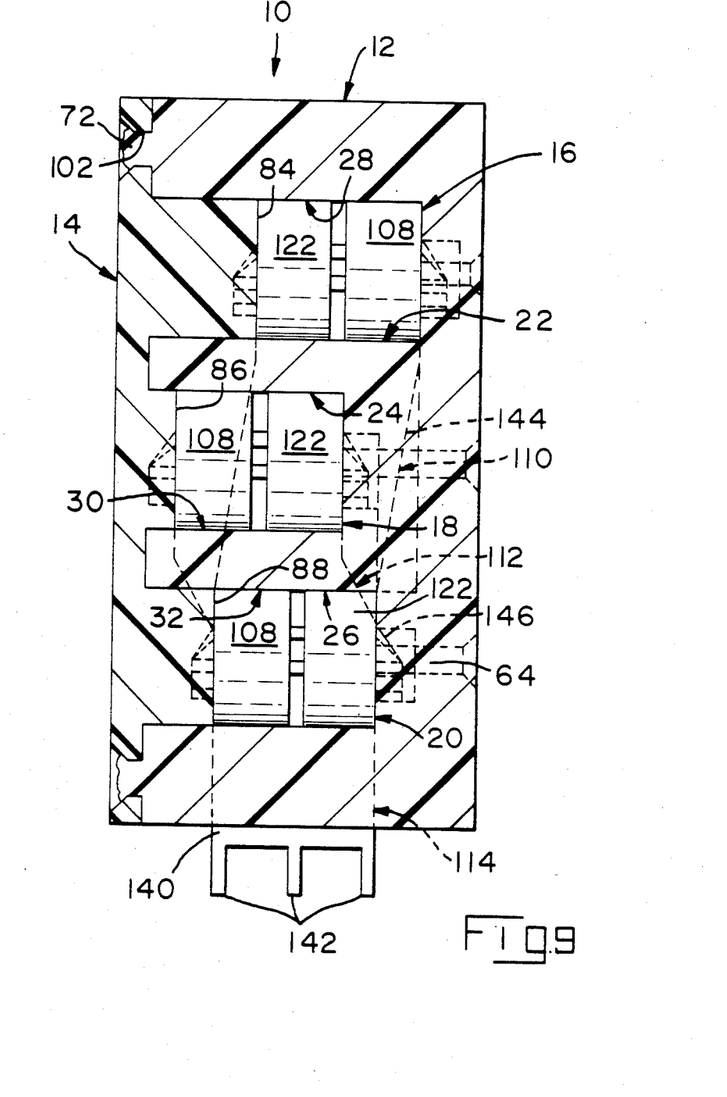
Figure 10:
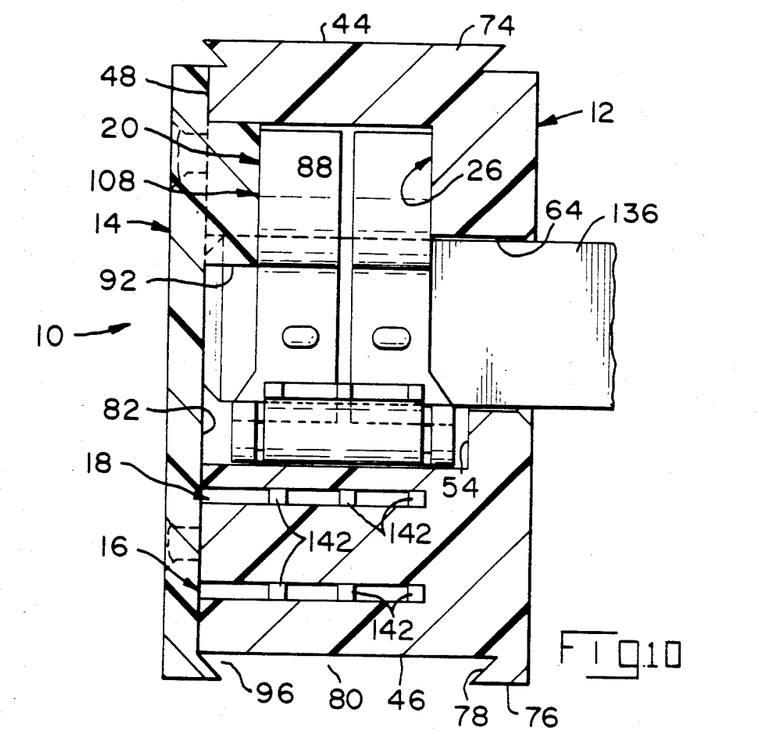
Figure 10A:
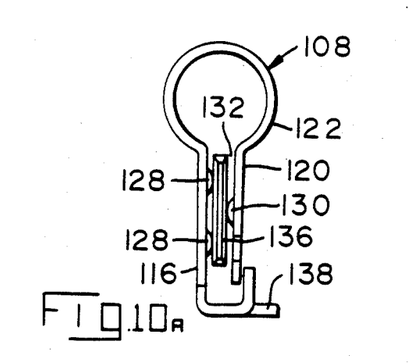
Figure 10B:
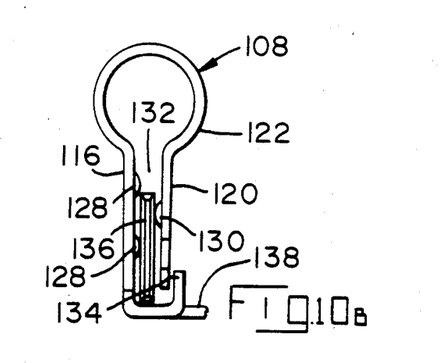
Figure 11:
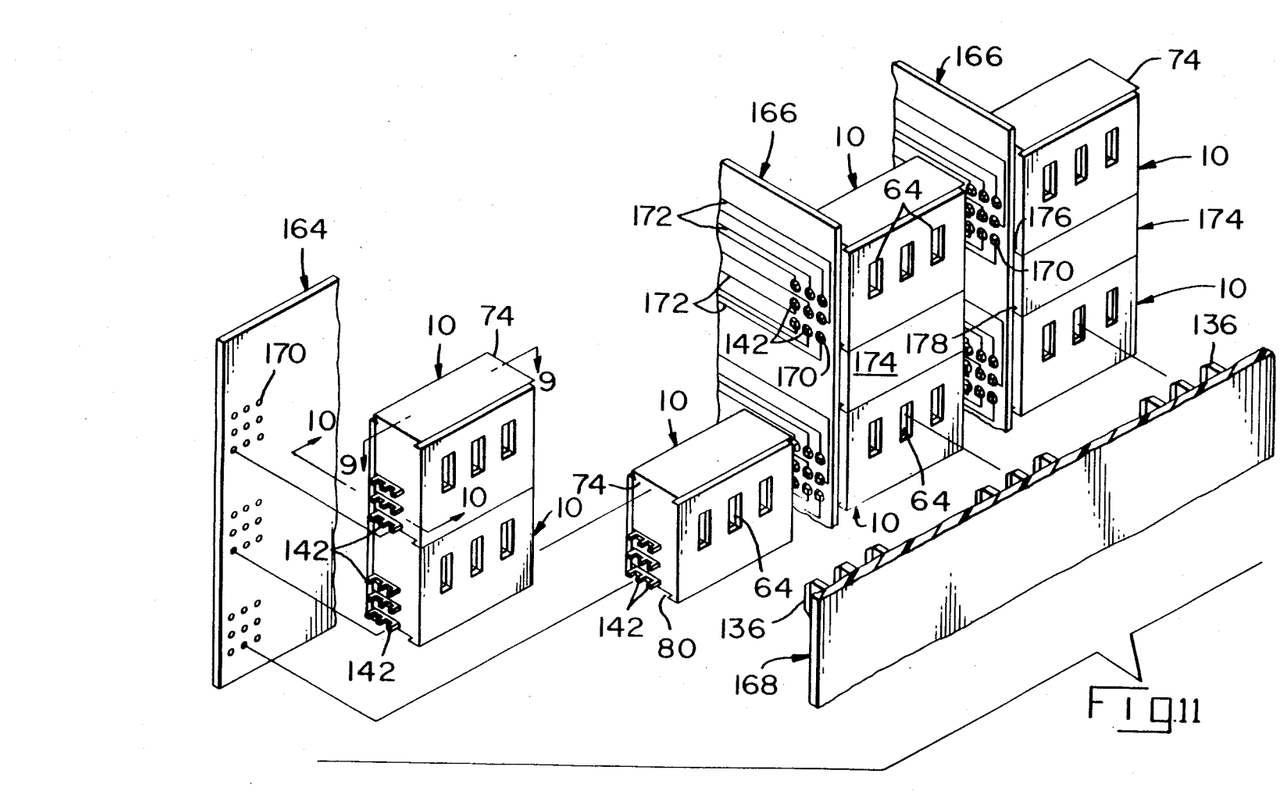
Figure 12:
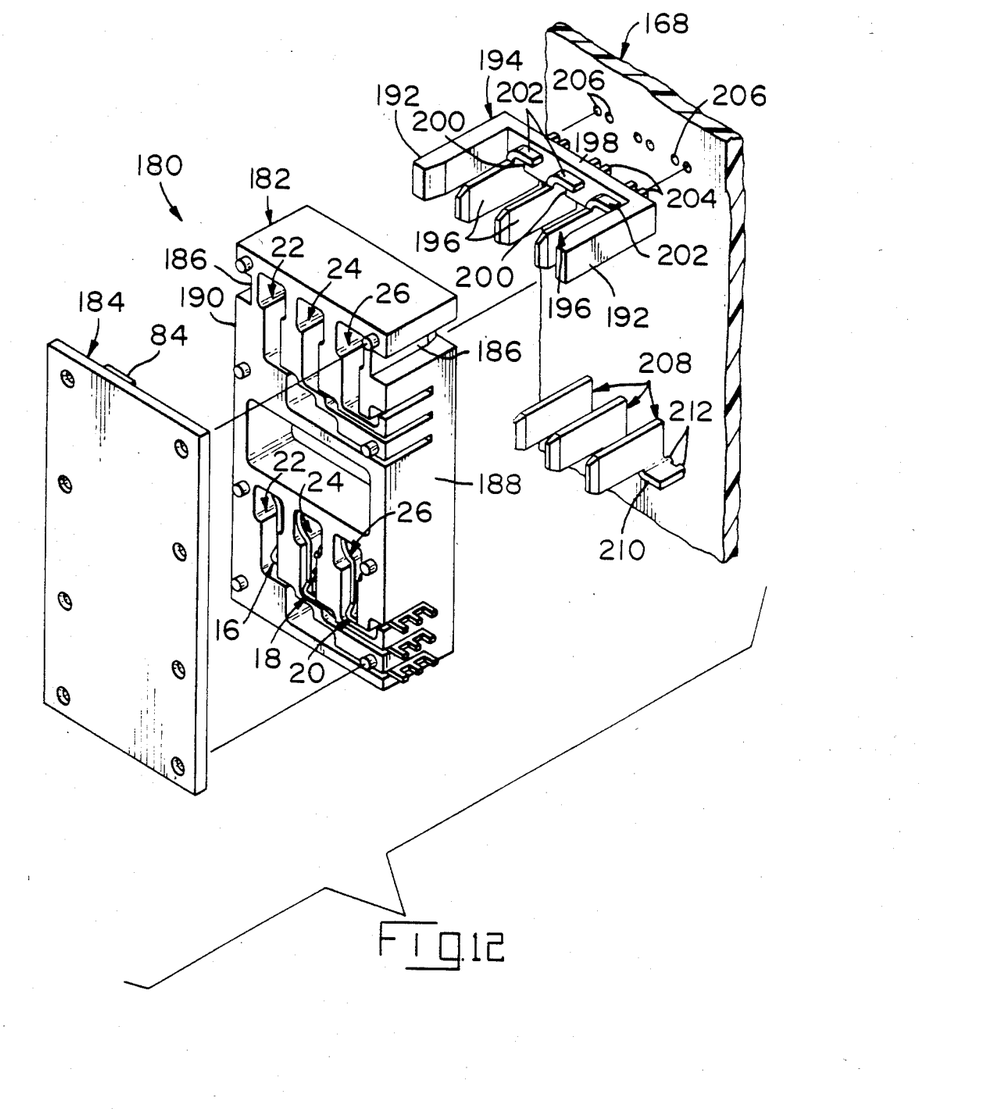

In the FIG. 1 embodiment, a mounting member 30 extends downwardly from the adaptor 10 and pivotally mounts a cylindrical lamp housing 31. In the FIG. 1 embodiment, the mounting member 30 is a vertical stem. Referring to FIG. 9, an adaptor 10' supports a mounting member 30', which pivotally mounts a cylindrical lamp housing 31'. In this embodiment, the mounting member 30' is a yoke. Various shapes and types of lamp housings 31 and mounting members 30 may be utilized, in accordance with the present invention.

Figure 3:
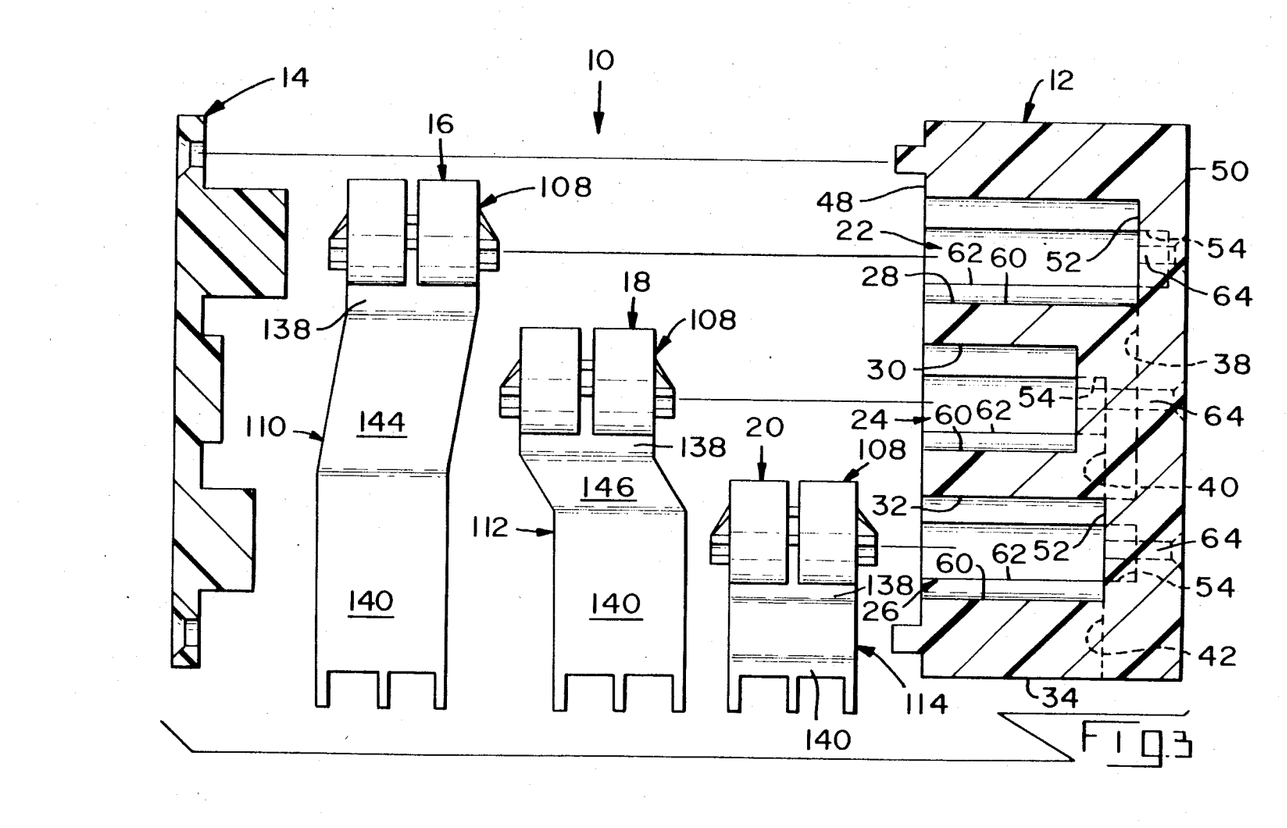
FIG. 3 is an exploded view, partially in cross-section, showing an adaptor assembly, according to the present embodiment, having a yoke lamp housing mounting at its lower end.
Figure 4:
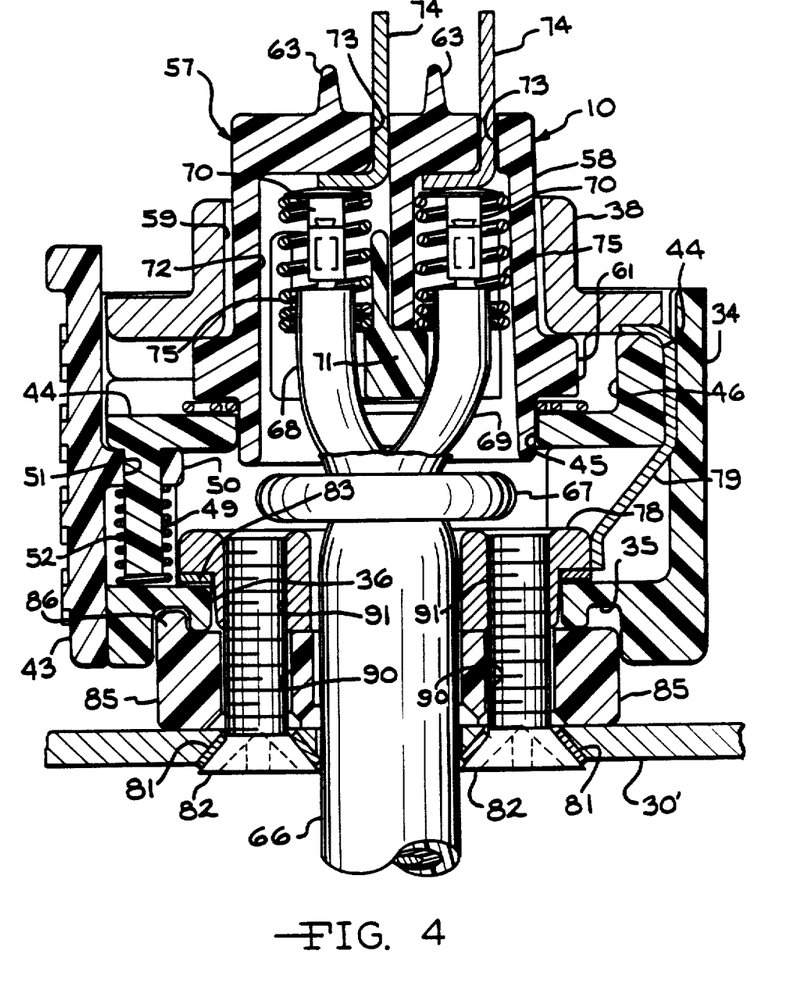
FIG. 4 is a cross-sectional view of the adaptor apparatus shown in FIG. 3 in its assembled position.
Figures 4A, 4B, 5:
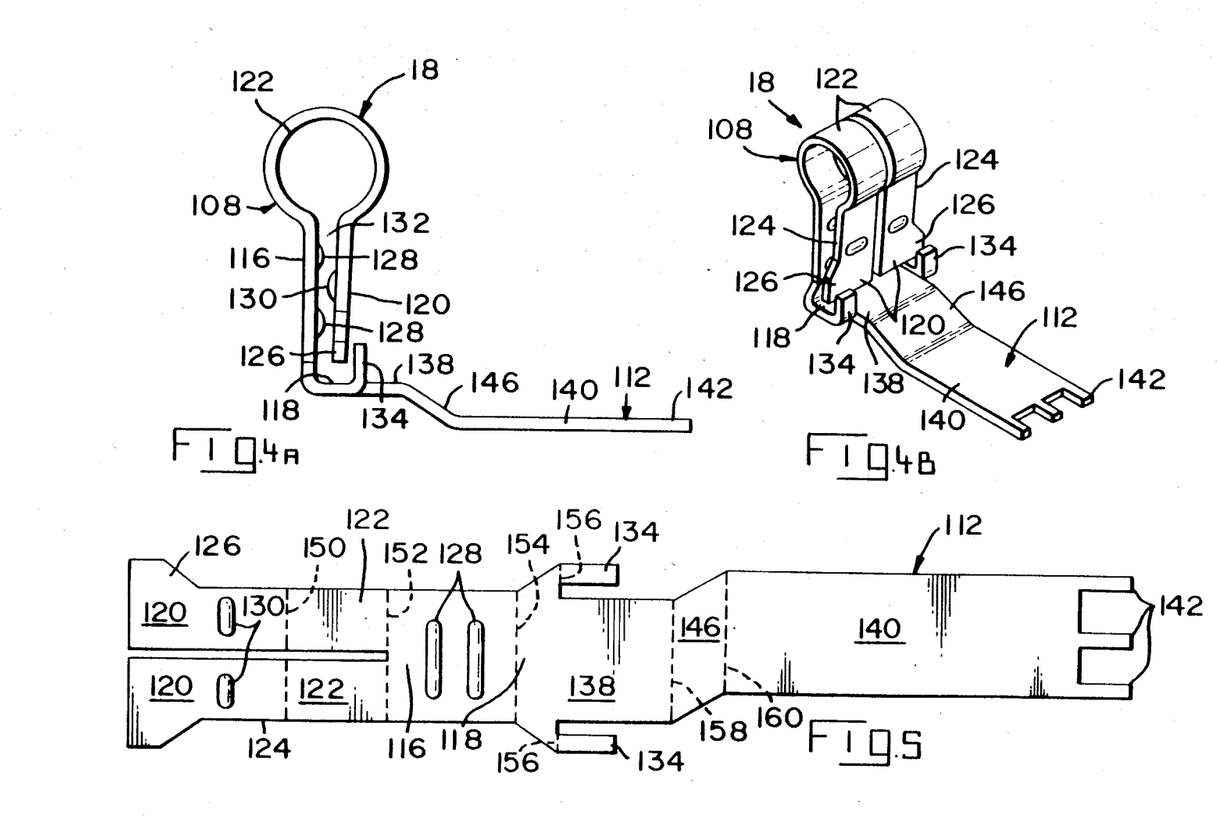
Figure 6:
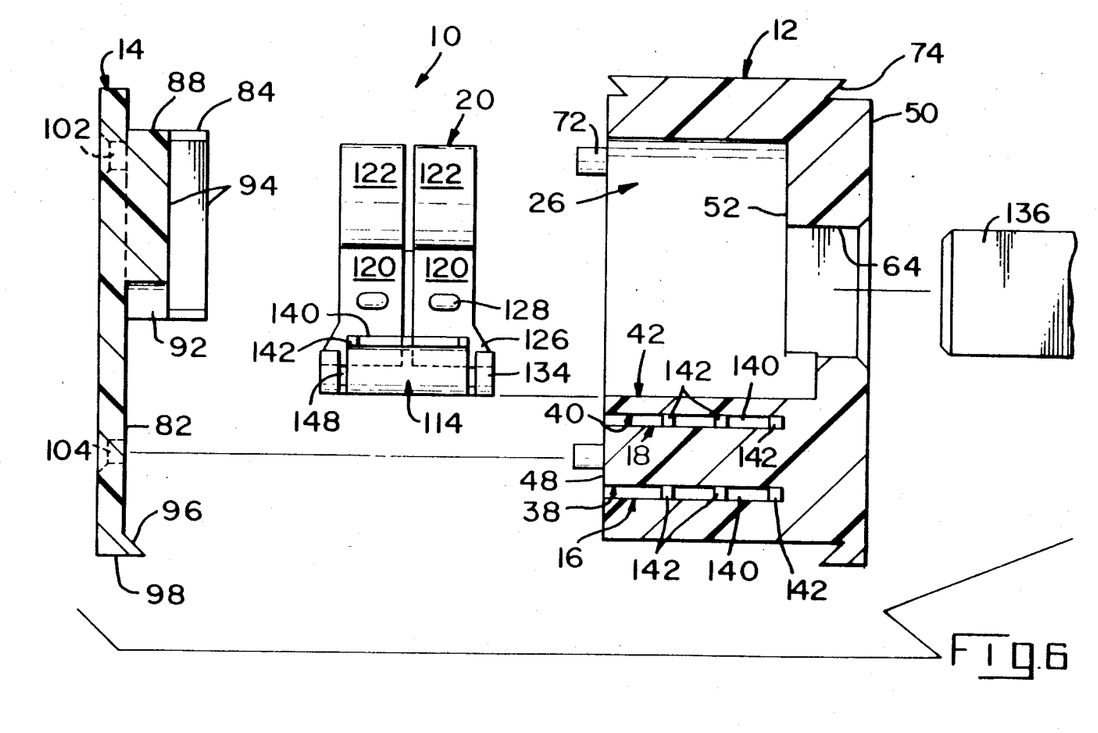

Referring to FIGS. 3 and 4, the adaptor assembly 10 includes a generally cup-shaped body 34. The body 34 defines a circular groove 35 in its bottom surrounding a central opening 36. The body 36 is preferably constructed of a plastic such as a polycarbonate, however, it may be constructed of other materials.

The body 34 includes a metallic lid 38 which is secured by screws 39. The lid 38 includes an upper eccentrically shaped wing member 40 (see FIG. 6) having outwardly extending retainers 41. When the lid 38 is inserted into the track receptacle 11 and rotated 90°, the retainers 41 cooperate with and secure the wing member 40 against the retaining flanges 15 and 16 of the track receptacle 11. This secures the body 34 in the track receptacle 11.

Referring to FIGS. 3-6, the body 34 also includes a vertically movable latch 43. A spring seat member 44 having a central opening 45 and an upper circular retaining groove 46 is mounted within the body 34, being secured by screws 39. The bottom of the screws 39 are secured in threaded openings 48, provided in the body 34.

The spring seat member 44 includes a depending post 49. The latch 43 has an inwardly directed projection 50 which defines an opening 51. The post 49 extends through the opening 51. A coil spring 52 is positioned on the bottom end of the post 49 (see FIG. 4) and urges the latch 43 toward an upper or locked position.

Referring to FIGS. 5 and 6, the latch 43 of the body 34 includes indicia, for example, indicating arrows 54. During initial installation, the adaptor 10 is positioned with the latch 43 parallel to one of the sidewalls 13 or 14 of the track receptacle 11. The latch 43 is moved manually downward against the force generated by the coil spring 52 to the unlocked position shown in FIG. 5. After the adaptor 10 is inserted into a proper position relative to the track receptacle 11, the adaptor 10 is rotated in the direction of the arrows 54. This locks the retainers 41 into the cooperating position with the retaining flanges 15 and 16 of the track receptacle 11. After the 90° rotation is completed, the coil spring 52 urges the latch 43 vertically upwardly into the locked position shown in FIG. 6.

Referring to FIGS. 3 and 4, a generally cylindrically shaped contact housing 57 is positioned within the body 34. The contact housing 57 has an upper cylindrical portion 58 which extends through an opening 59 defined by the lid 38. The contact housing 57 has a lower cylindrical portion 60 which is received by the central opening 45 defined by the spring seat member 44. The contact housing 57 also includes a ring member 61 which is mounted in the spring groove 46 defined by the seat member 44. A torsion spring 62 is mounted between the contact housing 57 and the spring seat member 44. The cylindrical upper portion 58 of the contact housing 57 has a pair of parallel guide members 63 extending upwardly from its top. The torsion spring 62 serves as rotational spring means to urge the guide member 63 into a parallel relationship with the latch 43 of the body 34. This insures that the guide members 63 will always be in correct alignment for insertion within the track receptacle 11. A stop member (not shown) on the ring member 61 of the contact housing 57 engages raised stops (not shown) in the groove 46 of the spring seat member 44. The groove stops are located 90° from one another. The parallel guide member 63 of the contact housing 57 are limited in movement between a direction parallel to the latch member 43 and a direction perpendicular to the latch member 43.

Referring to FIGS. 3 and 4, an electrical conduit 66 which is in communication with the lamp housing 31' extends upwardly through the yoke 30' and into the body 34. The electrical conduit 66 extends through a relief ring 67. Electrical wires 68 and 69 extend upwardly from the conduit 66 and terminate at spring biased contact buttons 70 which are mounted in a contact retainer 71. The contact retainer 71 is positioned within an opening 72 defined by the upper portion 58 of the contact housing 57. The upper portion 58 also defines a pair of contact slots 73 which receive a pair of L-shaped contacts 74. As shown in FIG. 4, the lower portions of the electrical contacts 74 are positioned against the contact buttons 70 and are urged upwardly by a pair of coil springs 75 which surround the contact buttons 70 and are mounted between the retainer 71 and the upper portion 58 of the contact housing 57. A pair of screws 76 mount the contact retainer 71 to the contact housing 57.

Referring to FIGS. 3 and 4, a metallic retainer ring 78 surrounds the conduit 66 and is seated on the body 34 adjacent the central opening 36. A metallic ground strap 79 engages the metallic ring 78 and extends to the metallic lid 38. A ground path is therefore established through the lamp housing 31, the yoke 30'', lockwashers 81, main mounting screws 82, the retainer ring 78, the ground strap 79, the lid 38, and the retaining flanges 15 and 16 of the track receptacle 11. A wavy washer 83 is positioned between retainer ring 78 and the body 34 to retard rotation between the mounting member 30 and the main body 34. To further insure that the electrical wires 68 and 69 are not unduly twisted, a disk 85, which surrounds the conduit 66 and has a stop member 86, is mounted adjacent the bottom surface of the body 34. The stop member 86 is positioned within the circular groove 35 of the body 34. Referring to FIG. 7, a stop projection or stop 88 extends into the groove 35. As the disk 85 is rotated, the disk stop member 86 engages the stop projection 88 in the groove 35 limiting rotation to aproximately one revolution.

The disk 85 also defines openings 90. The screws 82 extend through the openings 90 and are threadably engaged in threaded openings 91 provided in the retaining ring 78.

The screws 39 (see FIG. 3) extend downwardly through openings 93 in the lid 38; through openings 94 provided in the spring seat member 44; and are threaded into the threaded openings 48 defined in the base of the body 34.

When the stem mounting member 30 is utilized, as shown in FIG. 1, the major components of the adaptor assembly 10 are similar to the above described embodiment.

During use the adaptor assembly 10 is inserted in the track receptacle 11. As shown in FIG. 5 and explained above, the latch 43 is moved to the down or unlatched position and the contact housing 57 positioned within the track receptacle 11 between the sidewalls 13 and 14. The indicated arrows 54, in addition to telling the installer the direction in which to rotate the adaptor body 34, also indicate which of the circuits or conductors 23 and 25 will be used. This allows the installer to balance the lighting load. As the contact housing 57 moves vertically upwardly into the track receptacle 11, the parallel guide members 63 are received by the guide channels 20 and 21 defined by the insulator assembly 18.

As shown in FIG. 6, the spring biased contacts 74 engage one of the hot conductors 23 and the neutral conductor 24. The spring biased contacts 74 insure that good electrical communication is achieved.

The two hot conductors 23 and 25 are symmetrical with respect to the center neutral conductor 24. Therefore, the contacts 74 are in position to engage one of the conductors 23 and the neutral conductor 24 at all times. A 180° rotation of the adaptor assembly 10 aligns the contacts 74 with the other hot conductor 23 and the neutral conductor 24. This is achieved without the necessity of physically adjusting the contacts or providing extra conductors as was true in certain prior art units.

After the adaptor 10 is pushed home, the body 34 is rotated in the direction of the arrows 54. The lid retainers 41 are then engaged on the retaining flanges 15 and 16 of the track receptacle 11 and the spring biased latch 43 is released and allowed to move upwardly into the locked position, as shown in FIG. 6.

In addition to balancing the lighting loads, the present track lighting system, according to the present invention, allows flexibility in switching. For example, the embodiments described above provide for the use of two circuits and two switches; one circuit with two switches; or one circuit with one switch.

By having the conductors located in the top of the track receptacle 11, because of the electrical symmetry, polarity mistakes are reduced compared to prior art adaptors having conductors in their sidewalls.

The adaptor assembly 10, according to the present invention, also insures grounding of the system and minimizes the chance of overriding the grounding system.

The torsion spring 62, acting on the contact housing 57, aligns the parallel guide members 63 and the contacts 74 to insure that proper mating occurs with the receptacle guide channels 20, 21 and the respective conductors 23-24.

While the present invention has been specifically described, many modifications may be made without departing from the scope of the following claims.

What we claim:

1. An adaptor for connecting a luminaire to a track receptacle, said adaptor supporting said luminaire and being in electrical communication with said luminaire, said track receptacle defining an upper wall extending horizontally, two downwardly depending sidewalls and a retaining flange extending inwardly from each of said sidewalls, an insulator assembly mounted below said upper wall of said track receptacle defining a pair of parallel guide channels extending horizontally beneath said upper wall, a plurality of electrical conductors mounted by said insulator assembly adjacent to such upper wall of such track receptacle and having their bottom surfaces exposed, said adaptor comprising a body having a lid mounted on its upper end, said lid defining an opening therethrough, said lid having retainers extending outwardly for cooperation with such flanges of said track receptacle, a contact housing positioned within said body and having an upper portion extending through said lid opening, said upper portion defining a pair of parallel guide members for engaging such guide channels, a plurality of contacts extending upwardly from said upper portion for electrical engagement with such plurality of electrical conductors and first torsion spring means for urging said guide members to rotate to a predetermined position.

2. An adaptor, according to claim 1, wherein three conductors are mounted by said insulator assembly, said three conductors comprising a center neutral conductor and a pair of outer hot conductors symmetrically positioned relative to said center conductor, whereby said contacts engage one of said outer conductors and said neutral conductor and whereby upon rotating said contact housing 180° said contacts engage the other one of said outer conductors and said neutral conductor.

3. An adaptor, according to claim 1, including second spring means for urging said pair of contacts into engagement with such pair of electrical conductors.

4. An adaptor, according to claim 1, including a vertically movable latch on said body for locking said adaptor to said track receptacle and third spring means for urging said latch into a locked position.

5. An adaptor, according to claim 1, wherein such plurality of electrical conductors comprises a pair of electrically hot conductors and a center neutral conductor, and indicia means on said housing for indicating the direction to rotate the adaptor for locking the adaptor to the track and for indicating, after locking is completed, which circuit is being utilized.

6. An adaptor, according to claim 1, wherein said body defines an opening in its bottom, a circular groove defined by said body adjacent said bottom opening, a stop positioned with said groove, a disk mounted for restricted rotation with said groove, said disk defining a stop member for cooperation with said groove stop, and a mounting member depending beneath said disk.

7. An adaptor, according to claim 6, wherein said mounting member comprises a stem which pivotally mounts a lamp housing.

8. An adaptor, according to claim 6, wherein said mounting member comprises a yoke which pivotally mounts a lamp housing.

9. An adaptor for connecting a luminaire to a track receptacle, said adaptor supporting said luminaire and being in electrical communication with such luminaire, said track receptacle defining an upper wall, an insulator assembly mounted below said upper wall of said track receptacle, said insulator assembly mounting a plurality of electrical conductors adjacent such upper wall, said adaptor comprising a body having retaining means for engagement with such track receptacle, a contact housing positioned within said body and having an upper portion extending upwardly from said body, a pair of electrical contacts extending from said housing, guide means on said housing for aligning said contacts with such conductors, torsion spring means for urging said housing to rotate to a predetermined position and latching means on said body for locking said adaptor to such track receptacle.

* * * * *

UNITED STATES PATENT AND TRADEMARK OFFICE
CERTIFICATE OF CORRECTION

PATENT NO. : 4,671,585

DATED : June 9, 1987

INVENTOR(S) : Joseph Langer et al.

It is certified that error appears in the above-identified patent and that said Letters Patent is hereby corrected as shown below:

The Title Page, should be deleted to appear as per attached Tilte Page.

Signed and Sealed this

Twelfth Day of January, 1988

Attest:

DONALD J. QUIGG

Attesting Officer

Commissioner of Patents and Trademarks

United States Patent [19]

Langer et al.

[11] Patent Number: 4,671,585
[45] Date of Patent: Jun. 9, 1987

[54] LUMINAIRE ADAPTOR ASSEMBLY

[75] Inventors: Joseph Langer; Raymond A. Brown; Jon D. Hinnefeld, all of Vermilion, Ohio

[73] Assignee: National Service Industries, Atlanta, Ga.

[21] Appl. No.: 874,496

[22] Filed: Jun. 16, 1986

[51] Int. Cl.$^4$ .................................... H01R 13/60
[52] U.S. Cl. ............................ 439/117; 439/119; 439/207
[58] Field of Search .................. 339/20, 21 R, 21 S, 339/22 R, 22 B, 22 T, 23, 24

[56] References Cited

U.S. PATENT DOCUMENTS

| | | | |
|---|---|---|---|
| 2,720,632 | 10/1955 | Stieglitz | 339/22 B |
| 2,992,401 | 7/1961 | Lewis | 339/22 B |
| 3,015,082 | 12/1961 | Meacham | 339/22 B |
| 3,015,795 | 1/1962 | Meacham | 339/22 B |
| 3,150,908 | 9/1964 | Verrone | 339/91 R |
| 3,239,795 | 3/1966 | Verrone | 339/91 |
| 3,273,103 | 9/1966 | Ericson | 339/22 B |
| 3,391,377 | 7/1968 | Corl et al. | 339/21 R |
| 3,395,378 | 7/1968 | Ericson | 339/34 |
| 3,422,387 | 1/1969 | Sprigings et al. | 339/14 R |
| 3,489,981 | 1/1970 | Corl et al. | 339/21 R |
| 3,503,032 | 3/1970 | Routh et al. | 339/14 R |
| 3,529,275 | 9/1970 | Routh | 339/22 R |
| 3,589,660 | 6/1971 | Dunckel | 248/343 |
| 3,596,226 | 7/1971 | Meltzer | 339/21 R |
| 3,601,748 | 8/1971 | Hart | 339/22 B |
| 3,605,064 | 9/1971 | Routh | 339/21 R |
| 3,611,252 | 10/1971 | Fremont | 339/21 R |
| 3,649,951 | 3/1972 | Routh et al. | 339/21 R |
| 3,688,240 | 8/1972 | Routh et al. | 339/21 R |
| 3,731,255 | 5/1973 | Contratto | 339/21 R |
| 3,737,834 | 6/1973 | Contratto | 339/21 R |
| 3,748,629 | 7/1973 | Price | 339/21 R |
| 3,771,103 | 11/1973 | Attema | 339/21 R |
| 3,794,955 | 2/1974 | Bertrams | 339/21 R |
| 3,795,886 | 3/1974 | Hart | 339/21 R |
| 3,813,633 | 5/1974 | Clement | 339/21 R |
| 3,832,503 | 8/1974 | Crane | 339/21 R |
| 3,848,715 | 11/1974 | Hesse | 339/21 R |
| 3,871,729 | 3/1975 | Attema | 339/21 R |
| 3,871,730 | 3/1975 | Hesse | 339/21 R |
| 3,894,781 | 7/1975 | Donato | 339/22 B |
| 4,010,997 | 3/1977 | Bulanchuk | 339/22 B |
| 4,029,378 | 6/1977 | Bolis | 339/22 B |
| 4,032,208 | 6/1977 | Berkenhoff | 339/21 R |
| 4,050,555 | 9/1977 | Ross, Jr. | 339/22 T |
| 4,053,194 | 10/1977 | Gilman | 339/21 R |
| 4,087,147 | 5/1978 | Silvestris et al. | 339/21 R |
| 4,089,578 | 5/1978 | Valtonen | 339/21 R |
| 4,090,594 | 5/1978 | Ross, Jr. | 339/22 T |
| 4,096,349 | 6/1978 | Donato | 339/4 |
| 4,105,099 | 8/1978 | Bertrams et al. | 339/22 T |
| 4,108,523 | 8/1978 | Bolis | 339/22 B |
| 4,176,896 | 12/1979 | Wehling | 339/22 R |
| 4,245,874 | 1/1981 | Bishop | 339/22 B |
| 4,256,357 | 3/1981 | Vasseur et al. | 339/21 R |
| 4,289,365 | 9/1981 | Rutgers | 339/21 R |

Primary Examiner—Eugene F. Desmond
Assistant Examiner—Gary F. Paumen
Attorney, Agent, or Firm—Emch, Schaffer, Schaub & Porcello Co.

[57] ABSTRACT

An adaptor for connecting a luminaire to a track receptacle is disclosed. The track receptacle has retaining flanges along its bottom edges and an insulator assembly adjacent the top. The insulator assembly mounts parallel electrical conductors in the top of the track receptacle and also defines parallel guide channels. The adaptor includes a body having a lid. The lid includes retainers for mating with the retaining flanges. A pair of spring biased electrical contacts extend upwardly from a contact housing mounted in the body and extending through the lid. The housing includes a pair of guide members which are rotationally biased to an aligned position for insertion into the track receptacle.

9 Claims, 9 Drawing Figures